Oct. 31, 1967
G. A. PETERSEN
3,349,508
TOOTH WITH T-SHAPED SHANK
Filed Sept. 7, 1965
2 Sheets-Sheet 1
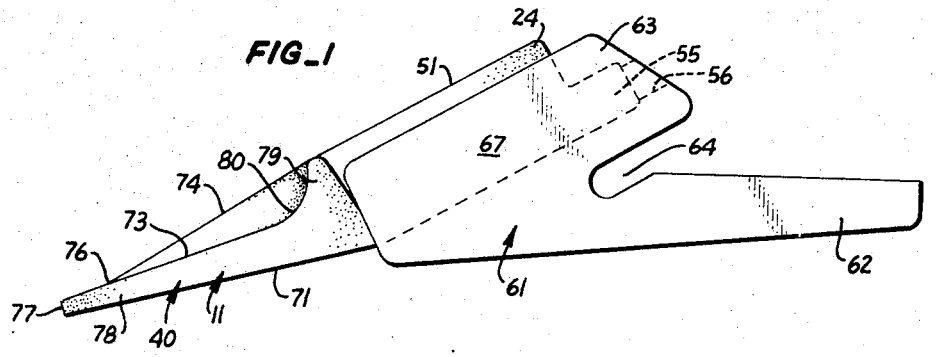
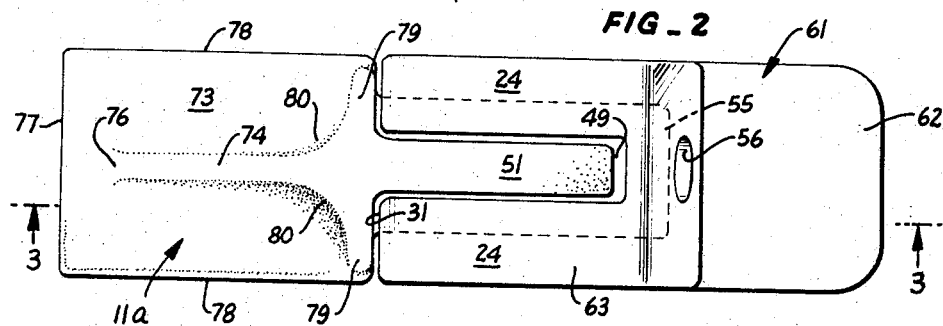
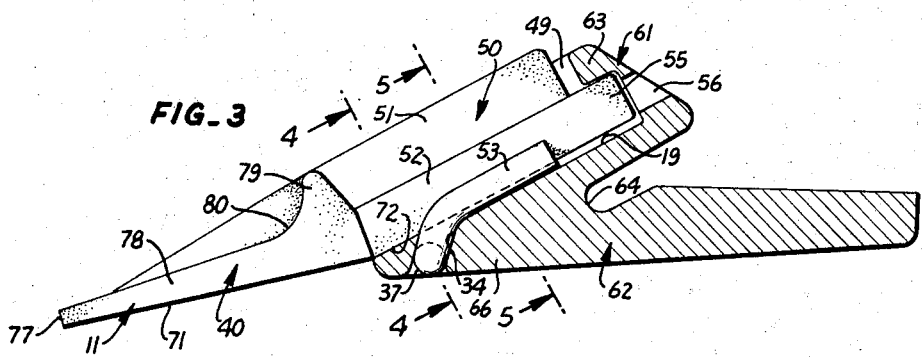
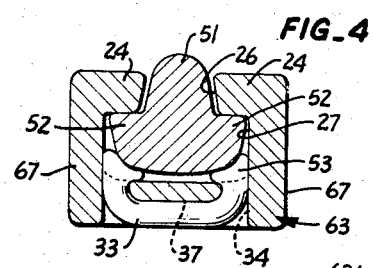
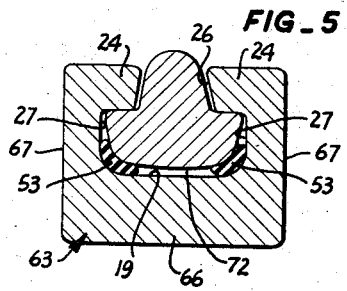
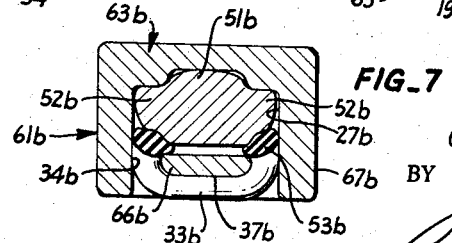
INVENTOR.
GERALD A. PETERSEN
BY
ATTORNEY Oct. 31, 1967         G. A. PETERSEN         3,349,508
                TOOTH WITH T-SHAPED SHANK
Filed Sept. 7, 1965                         2 Sheets-Sheet 2
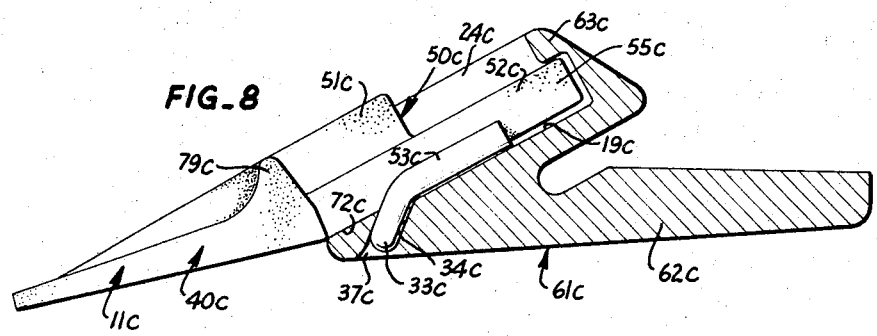
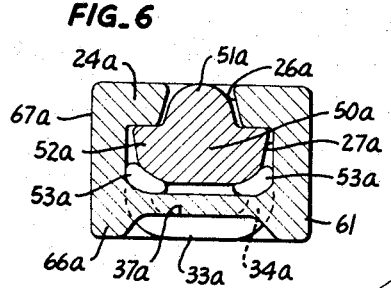
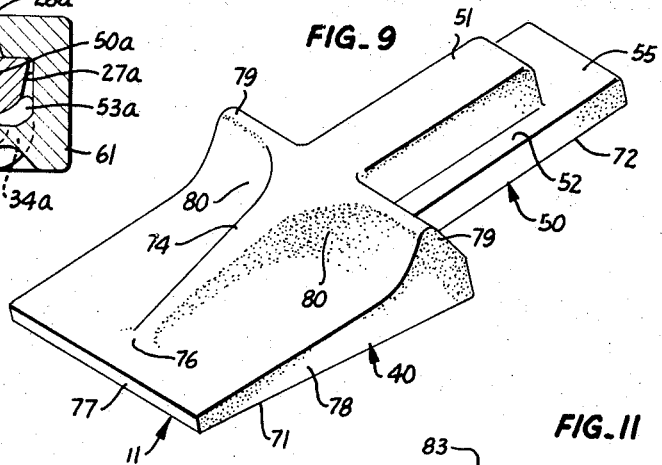
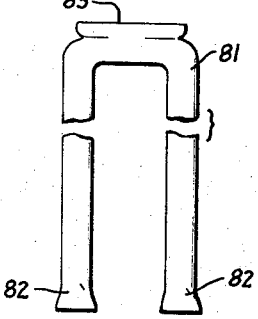
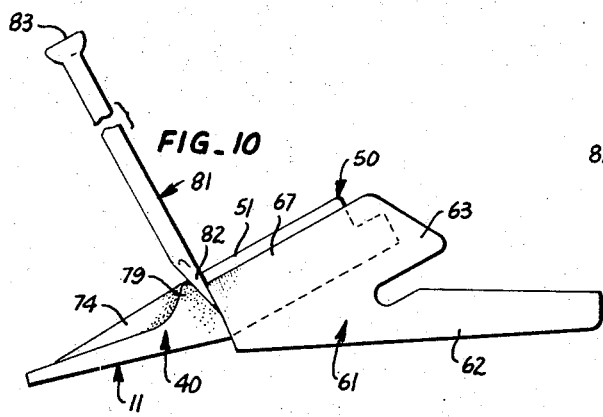
INVENTOR.
GERALD A. PETERSEN
BY
ATTORNEY

United States Patent Office 3,349,508
Patented Oct. 31, 1967

3,349,508
TOOTH WITH T-SHAPED SHANK
Gerald A. Petersen, Sunnyvale, Calif., assignor of one-half to Anita E. Petersen, Saratoga, Calif.
Filed Sept. 7, 1965, Ser. No. 485,154
15 Claims. (Cl. 37—142)

This application is a continuation-in-part of copending application Ser. No. 453,422, filed May 5, 1965.

The present invention relates to a new and improved replaceable tooth for earth digging equipment. The type of equipment with which this invention may be used is diversified and includes back hoes, loaders, buckets, scrapers, scarifiers, excavators and similar shovel-type excavating equipment, as well as earth augers, trenching machines, and the like.

A feature of the invention is the shape of the proximal portion of the tooth which is received in the tooth holder and the cooperating shape of the recess or socket of the tooth holder which is complementary thereto. In cross section, the portion of the tooth received in the holder is T-shaped. In one form of the invention the leg of the T is received between overhanging lips of the socket and the crossarms of the T are received in laterally-diverging extensions of the socket. Such shape assures that the tooth will be securely held against misalignment despite considerable force encountered in the digging action. In a preferred form of the tooth, the rib or leg of the proximal end of the tooth is higher than the socket so that the rib extends exteriorly of the tooth holder. Such shape facilitates driving the tooth out of its socket when the tooth must be replaced, in that a tool may be inserted behind the leg for such purpose.

In another form of the invention, the rib of the proximal portion of the tooth is flush with the tooth-holder and does not project thereabove. This form of the invention has as an advantage that the upstanding rib does not interfere with operation of the digging equipment. Provision is made by means of a hole formed in the tooth-holder to drive a tool behind the tooth to extract the same from its socket when required for replacement.

In still another form of the invention, the tooth-holder is closed over and the portion of the tooth received in the holder is entirely concealed. In this form of the invention it is also necessary to use a tool inserted through a hole in the back of the holder to drive the tooth from its socket.

The rib and laterally extending feet provide a T-shaped cross-section of the proximal portion of the tooth which considerably enhances the strength of the tooth, a feature of advantage under severe operating conditions. At the same time, the rib may project above the holder for at least a portion of its length so that the projecting portion may be struck with a hammer or other tool to dislodge the tooth from the holder. In one set of the drawings and following description the rib is shown protruding above the holder for a substantial portion of its length, but this construction is subject to modification, as hereinafter set forth in detail. Thus, in another modification the rib is elevated for only a portion of its length.

Alternatively one or more holes may be formed in the holder to provide access for a tool to the back of the tooth so that it may be driven out by such method. One or more holes may also be provided to permit escape of dirt which might otherwise prevent proper seating of the tooth in the socket in the holder.

The preferred retention means for retaining the tooth in its socket, as hereinafter described in detail, is a resilient insert which is doubled over to a substantial U-shape and both ends of the insert are then inserted through appropriate holes in the tooth-holder, extending into the tooth socket. When the tooth is forced into the socket, the ends of the insert are bent back and compressed between the tooth and the wall of the socket to restrain unintentional dislodgment of the tooth from its holder. To eliminate undue wear of the rubber insert, a groove may be formed in the exterior of the holder interconnecting the ends of the holes to recess the connecting portion of the rubber insert below the surface of the holder so that it is not abraded.

Use of a rubber retainer bent in U-shape has several advantages over a straight piece of resilient material. One advantage is that the rubber is less likely to fall out of the holder when the tooth is removed and prior to the time the tooth is inserted if it is bent in such shape. Bending in such fashion puts stress on the rubber which discourages its slipping out of place. This feature is of great convenience in locations where finding the dropped retainer or replacing with a new one would be difficult.

Still another advantage of the reversely bent retainer is that it tends to locate the retainer in a more positive and definite manner. Where a single length of rubber is installed in a hole, it tends to be pulled along when the tooth is inserted, but the extent of movement longitudinally of the tooth is unpredictable. Hence the total area of the rubber compressed between tooth and holder tends to be variable and its retaining effect is somewhat uncertain. This uncertainty makes accurate engineering computations impractical. When the rubber is doubled over, the forces tending to pull each leg are balanced and hence the rubber is elongated and compressed but not pulled out of position. Therefore, the effective length or area is not so uncertain and the retention effect considerably more predictable.

An important feature of the invention is the fact that the tooth seats against the front end of the tooth-holder rather than seating interiorly of the tooth-holder. This construction avoids undue strain on the tooth and the holder which might otherwise occur if the corner of the tooth were to strike a rock or other hard object with great force. The back portion of the tooth transmits thrust to the holder. Additionally, protuberances extending transversely immediately in front of the holder reduce wear of the holder, particularly since the tooth is relatively hard and is also replaceable.

The shape of the distal portion improves the digging characteristics of the tooth blade. Thus a central longitudinal rib or spine on one surface of the tooth increases in elevation rearwardly. Immediately forward of the holder are transverse protuberances which merge with the rearward end of the spine. Rounded fillets occur at the corners where spine and transverse protuberances coincide. Surfaces thus described tend to break up the soil through which the tooth moves, curving the soil outward and upward, breaking up the formation with an explosive action. Such action is particularly effective in digging highly compacted soils.

Another feature of the invention is an alternate means for extraction of the tooth is provided where no protruding rib is used or where space considerations make driving the tooth from the holder by striking the rib inconvenient. A staple shaped tool fitting behind the back end of the blade of the tooth and between said back end and the outer edge of the holder. The space between legs is such as to straddle the proximal tooth shank. By tapping the connecting part of the tool the legs wedge behind the blade and force the blade away from the holder.

Other objects of the present invention will become apparent upon reading the following specification and referring to the accompanying drawings in which similar characters of reference represent corresponding parts in each of the several views.

In the drawings:

FIG. 1 is a side elevational view of the tooth and tooth-holder.

FIG. 2 is a plan view thereof.

FIG. 3 is a sectional view taken substantially along the line 3—3 of FIG. 2.

FIGS. 4 and 5 are sectional views taken substantially along corresponding lines in FIG. 3.

FIG. 6 is a view similar to FIG. 4, of a modification.

FIG. 7 is a view similar to FIG. 4, of still another modification.

FIG. 8 is a view similar to FIG. 3 of a further modification.

FIG. 9 is a perspective view of a tooth in accordance with FIGS. 1 to 5.

FIG. 10 is a schematic side elevational view of use of a tool to extract a tooth.

FIG. 11 is an enlarged front elevation of a tool used in FIG. 10.

In the form of the invention shown in FIGS. 1 to 5, a tooth 11 is held in a holder 61. Holder 61 is shown shaped to hold a single specific tooth 11 and may be fastened by any suitable means to digging equipment, as by welding, bolting, or the like. On the other hand, the holder may be constructed to retain a plurality of teeth rather than a single tooth. As illustrated particularly in FIGS. 1 to 3, base 62 of holder 61 may be welded, bolted, or otherwise fixed to the digging equipment. On the other hand, holder 61 may be affixed to an earth auger, trenching machine, bucket lip, back hoe, or a wide variety of other tools and machines as an integral portion thereof. Base 62 is shown as being of extended length which is suitable for attachment to the implement. Disposed at an angle and slanted downwardly-outwardly, as viewed in FIG. 1, is socket forming portion 63 with a cleft 64 formed between the upper end of the socket forming portion 63 and base 62. The exterior of socket forming portion 63 is preferably rectangular in cross-section having bottom 66 and sides 67, and is formed with a T-shaped socket having a bottom wall 19 and side walls 27. Overhanging lips 24 are formed on the upper surface with a narrow gap or slot 26 between lips 24. Below lips 24 the recess is wider, having laterally diverging extensions 27.

For the purpose of providing entry for the resilient retainers 33, hereinafter described into the recess of the holder, holes 34 are formed in bottom 66 of socket forming portion 63 slanted inwardly and opening into extensions 27 adjacent to corners along either side of bottom 19. The outer ends of holes 34 are joined by groove 37 having a depth about equal to the diameter of holes 34.

Tooth 11 has a distal portion 40 and a proximal portion 50. Distal portion 40 is subject to considerable variation. In the form herein shown, the bottom surface 71 of tooth 11 is disposed at an obtuse angle with respect to the bottom 72 of proximal portion 50. The top surface 73 converges toward surface 71 and is divided by a medial longitudinal rib 74 which slants downward-forward toward top surface 73 and merges therein at a terminus 76 spaced rearward from the blunt transverse perpendicular forward end 77 of the tooth. Surface 73 slants converging forwardly relative to bottom surface 71 at an angle of about 5°, whereas the top of rib 74 slants with respect to said bottom surface 71 at an angle of about 10°.

The side edges 78 of the tooth 11 are vertical and parallel and are spaced apart about the same distance as sides 67 of holder 61.

Immediately forwardly of holder 61 are laterally extending protuberances 79 on either side of rib 74 which, in effect, comprise a transverse rib. Protuberances 79 have an elevation at least as high as the top edge of the proximal rib 51 to protect the same against abrasion. It will also be noted that rib 74 originates at about the same elevation as the top of the holder for the same purpose. The corners 80 where rib 74 and protuberances 79 coincide are rounded and filletted to direct the dirt dug by the front cutting edge 77 sidewardly. Protuberances 79 limit inward movement of the tooth relative to holder 61 and insure that the tooth seats against the front end of the holder and not at the back of the holder. This avoids undue strain at the point where the front of the holder and the tooth coincide, which in the event of the corner of the tooth hitting a rock or other hard object with great force might cause a fracture or dislodgment of the tooth.

Proximal portion 50 of tooth 11 is T-shaped in cross-section complementary to the socket and has an outwardly extending rib 51 which fills the space between lips 24 and has laterally projecting legs 52 which substantially fill extensions 27 of the socket of the tooth-holder. The length of rib 51 is shown less than the corresponding dimension of the socket providing a space 49 at the back of the tooth through which an instrument may be inserted to drive the tooth out of its socket when required for replacement. Legs 52 extend rearward in a rear extension 55, bethind the rearmost end of rib 51. Extension 55 enhances the stability of the tooth in its holder. It will be noted particularly in FIG. 4, that the upper edge of rib 51 may be elevated substantially above the level of lips 24 and thus an instrument may be used to drive the back end of rib 51 forwardly to force the tooth out of its socket. This is particularly desirable if opening 49 is eliminated. The extended height of the rib protects the socket to some extent against abrasion. The elevated portion of rib 51 may extend for only a portion of its length as indicated by reference numeral 51c in FIG. 8. Hole 56 may be formed in the back end of the recess or socket receiving the tooth. Such hole 56 permits escape of dirt or other debris which may enter the recess and prevent proper seating of the tooth.

The preferred retaining means for the tooth is a short section 33 of circular section resilient material, such as natural rubber, neoprene synthetic rubber, or similar material. Where high temperatures are encountered as a result of the digging action, synthetic materials are particularly desirable. The cross-section of retainer 33 is approximately equal to that of holes 34 and groove 37. Insert 33 is bent into U-shape and the ends are inserted through holes 34 into the recess prior to the insertion of the tooth 11. As the tooth is forced into its socket, the ends 53 of retainer 33 are bent back and compressed in the corners between walls 27 and bottom 19. Insert 33 restrains unintentional withdrawal of the tooth from its socket and also accommodates variations in dimensions of the parts. Since the pull on each end 53 is substantially the same, the insert 33 is not pulled out of position and does not move longitudinally in an unpredictable manner. Accordingly, the retention effect is substantially uniform. When it is necessary to remove the tooth, the tooth slips relative to insert ends 53 to permit such withdrawal.

A modified tooth form is shown in FIG. 6. Since the construction is quite similar to that of the preceding modification, the same reference numerals are used followed by the subscript a. It will be noted that the rib 51a is shorter than that of the preceding modification and does not project up above the top surface of the lips 26a. In some uses this is a preferable construction. In order to remove the tooth, a tool is inserted in the space 49 behind the tooth to drive the tooth forwardly.

A further modified tooth and tooth-holder is shown in FIG. 7, wherein the top of tooth-holder 61b is closed over and opening 26 omitted and rib 51b is shorter and does not project exteriorly of the top of the holder 61b. In other respects, the elements of FIG. 7 are similar to the preceding modifications and the same reference numerals are used followed by the subscript b.

In use, prior to insertion of tooth 11 into socket 63, insert 33 is doubled over into U-shape and the ends 53 inserted through holes 34. The proximal end 50 of tooth 11 is then inserted in the socket and, as the back end of the tooth encounters ends 53 of the insert, they are bent back and into the corners as shown in FIG. 5, and deformed to approximately the shape there illustrated. The insert ends 53 restrain unintentional withdrawal of the tooth from its socket. However, when it is necessary to replace the tooth it may be driven out of its socket as previously described. The distal portion 40 of the tooth performs the digging function. Longitudinal rib 74 reinforces the blade of the tooth and assists in fracturing the formation being dug. Protuberances 79 limit inward movement of the tooth relative to the socket and, also, assist in protecting the tooth-holder from abrasion.

The digging action of distal portion 40 is particularly effective in compacted soils, the rib 74 increases in elevation and the fillets at its base and the fillets at the front of protuberances 79 as well as corners 80 tends to break up the soil sliced by the cutting edge 77, wedging it outward and upward, breaking the earth into relatively small particles or chips with an explosive action. The tooth thus works more effectively in difficult soils than prior teeth.

An alternate extraction means is shown in FIGS. 10–11. Tool 81 has the lower ends of legs 82 pointed and spaced apart a distance slightly greater than the width of legs 52. Connecting portion 83 is flat. Legs 82 are positioned straddling proximal portion 50 behind protuberances 79 immediately ahead of forward end 31 of holder 61. When connecting portion 83 is hammered downward, legs 82 pry tooth 11 away from holder 61. This means of extraction is particularly useful where it is inconvenient to drive rib 51 outward or where rib 51 does not protrude, as in FIGS. 6 or 7.

What is claimed is:

1. In combination, a tooth having distal and proximal portions and a tooth holder shaped to receive said proximal portion, said proximal portion being T-shaped in cross-section having an outward projecting rib and laterally extending feet, said distal portion having a broad blade extending to the forward end of said tooth and having a bottom surface merging with the bottoms of said feet and generally extending as a forward projection of said feet, said tooth holder formed with a socket substantially complementary to said proximal portion, the forward end of said tooth being substantially longitudinally forward of said feet, whereby the reaction to digging force imparted to said forward end is transmitted through said tooth in line with said feet to said tooth holder.

2. The combination of claim 1, in which said tooth-holder has a longitudinally extending gap coinciding with said rib, said rib extending into said gap.

3. The combination of claim 2, in which at least a part of the outer edge of said rib projects beyond the top of said tooth-holder, the projecting portion of said rib exposed for driving said tooth out of said holder.

4. The combination of claim 2, in which the outer edge of said rib is substantially flush with the top of said tooth-holder.

5. The combination of claim 1, in which said tooth-holder is closed over across the outer edge of said rib, enclosing said proximal portion.

6. The combination of claim 1, in which said feet extend rearward a greater distance than said rib in a rearward extension, said holder shaped to accommodate said rearward extension.

7. The combination of claim 1, in which said socket is formed with at least one longitudinally extending hole at its rearward end for escape of debris from said socket.

8. The combination of claim 1, in which said tooth-holder is formed with an aperture communicating with said socket and which further comprises a resilient insert partially in said aperture extending into said socket and compressed between said proximal portion and a wall of said socket to restrain withdrawal of said tooth from said tooth-holder.

9. In combination, a tooth having distal and proximal portions and a tooth-holder shaped to receive said proximal portion, said proximal portion being T-shaped in cross-section having an outward projecting rib and laterally extending feet, said tooth-holder formed with a socket substantially complementary to said proximal portion, said tooth-holder formed with a pair of apertures communicating from the exterior into said socket, and a resilient retainer bent into U-shape, the ends of said retainer fitting through said holes and into said socket, said ends compressed between said proximal portion and walls of said socket to restrain withdrawal of said tooth from said holder.

10. The combination of claim 1, in which said distal portion is formed with a substantially rectangular blade and a transverse protuberance above said blade extending to the side edges of said blade and seating against the forward end of said tooth-holder to limit inward movement of said tooth relative to said holder.

11. In combination, a tooth having distal and proximal portions and a tooth-holder shaped to receive said proximal portion, said proximal portion being T-shaped in cross-section having an outward projecting rib and laterally extending feet, said tooth holder formed with a socket substantially complementary to said proximal portion, said distal portion formed with a substantially rectangular blade and a transverse protuberance above said blade extending to the side edges of said blade and seating against the forward end of said tooth-holder to limit inward movement of said tooth relative to said holder, said distal portion further formed with a longitudinal spine sloping upwardly-rearwardly above said blade up to said protuberance, the maximum elevation of said spine and said protuberances being substantially equal.

12. The combination of claim 11, in which the corners where said spine joins said blade are rounded, the corners where said protuberance joins said blade being rounded and the corners where said blade, spine and protuberance join being rounded.

13. A tooth having distal and proximal portions, said proximal portion T-shaped in cross-section having an upward projecting rib and laterally extending feet, said distal portion formed with a broad, substantially rectangular blade extending to the forward end of said tooth and a transverse protuberance across one surface of said blade out to the edges of said blade, the bottom surface of said blade merging with the bottoms of said feet and generally extending as a forward projection of said feet, the forward end of said tooth being substantially longitudinally forward of said feet.

14. A tooth having distal and proximal portions, said proximal portion being T-shaped in cross-section having an upward projecting rib and laterally extending feet, said distal portion formed with a substantially rectangular blade and a transverse protuberance across one surface of said blade out to the edges of said blade, said distal portion formed with a central longitudinal spine sloping downwardly-forwardly from said protuberance toward said forward end of said tooth and merging with said blade at the forward end of said spine.

15. A tooth according to claim 14, in which the corners where said spine meets said blade, where said protuberance meets said blade and where said blade, spine and protuberance meet are rounded to curve earth sliced by the forward edge of said blade upwardly and outwardly to explode highly compacted soils.

References Cited

UNITED STATES PATENTS

| | | | |
|---|---|---|---|
| 213,961 | 4/1879 | Wheatly. | |
| 775,770 | 11/1904 | Herrod | 172—751 X |
| 1,519,101 | 12/1924 | Armstrong | 37—142 |
| 3,057,091 | 10/1962 | Petersen | 37—142 X |

FOREIGN PATENTS 103,025　1/1917　Great Britain.

ABRAHAM G. STONE, *Primary Examiner.*

A. E. KOPECKI, *Assistant Examiner.*